Sept. 22, 1959  P. E. OHLSON ET AL  2,905,127
SEAPLANE SERVICING FACILITY
Filed July 16, 1956  4 Sheets-Sheet 1

INVENTOR
PAUL E. OHLSON
EDWARD A. HODGE

BY *Cushman, Darby & Cushman*
ATTORNEY

Sept. 22, 1959  P. E. OHLSON ET AL  2,905,127
SEAPLANE SERVICING FACILITY

Filed July 16, 1956  4 Sheets-Sheet 2

INVENTOR
PAUL E. OHLSON
EDWARD A. HODGE

BY
Cushman, Darby & Cushman
ATTORNEY

Sept. 22, 1959 P. E. OHLSON ET AL 2,905,127
SEAPLANE SERVICING FACILITY
Filed July 16, 1956 4 Sheets-Sheet 3

INVENTOR
PAUL E. OHLSON
EDWARD A. HODGE
BY
Cushman, Darby & Cushman
ATTORNEYS

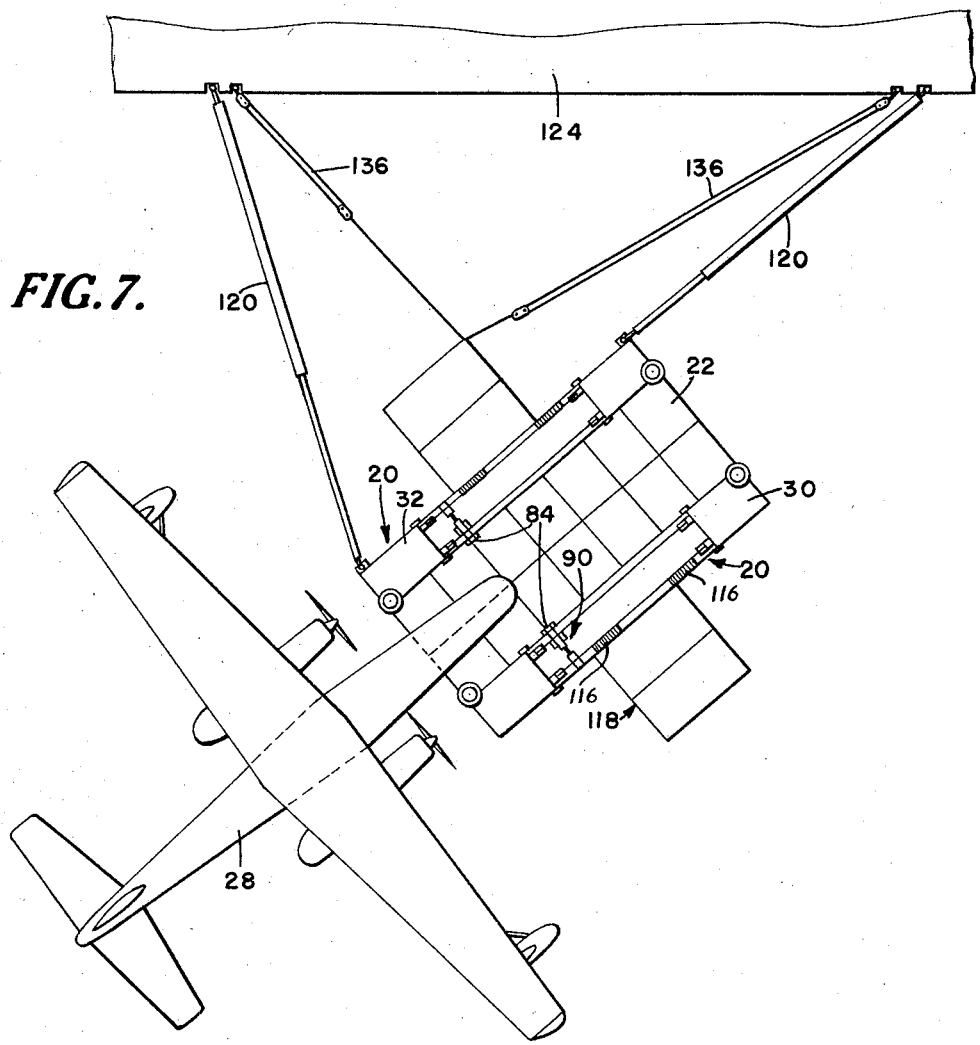

United States Patent Office 2,905,127
Patented Sept. 22, 1959

2,905,127

SEAPLANE SERVICING FACILITY

Paul E. Ohlson and Edward A. Hodge, Wilmington, Del., assignors, by mesne assignments, to The Martin Company, Baltimore, Md., a corporation of Maryland Application July 16, 1956, Serial No. 598,200

15 Claims. (Cl. 114—43.5)

This invention relates to a water-borne apparatus for servicing large seaplanes of the flying boat variety on the high seas and in harbor areas which are not provided with suitable seaplane beaching facilities. More particularly, it is within the contemplation of this invention to provide means and apparatus which are constructed and arranged to float on the surface of the water and provide a working platform or area to enable personnel to service water-borne aircraft.

While some seaplanes are equipped with one or more pontoons depending from their underside, the more modern trend is to so construct the fuselage that it acts as a hull to support the aircraft on the water and seaplanes of this variety are sometimes termed "flying boats." Certain amphibian aircraft are included within this category and the term "flying boat" as used hereinafter shall be deemed to include any large aircraft having substantial hull areas. While the fuselage portions of these aircraft are usually so constructed as to be somewhat stronger than the corresponding members on a conventional aircraft, the hull portions are nevertheless relatively weak and fragile and are not capable of sustaining large amounts of localized stress and must be handled with considerable care to avoid any injury which may destroy the watertight integrity thereof.

The other portions of such aircraft are, like the corresponding members of conventional aircraft, quite fragile and easily damaged. It will therefore be seen that any water-borne seaplane servicing apparatus must be so constructed and arranged so as to minimize the possibility of any damage to the aircraft with which it is used, either from collision when the seaplane is being moved alongside the servicing apparatus or as a result of wave action causing a relative movement between the two.

It has been previously proposed to provide waterborne servicing facilities for seaplanes, for example one or more floats or vessels have been anchored in position to form a floating dock. When such a floating dock is used, the aircraft is taxied or towed alongside and made fast thereto by conventional mooring arrangements. As water-borne flying boats are somewhat unwieldy and difficult to control with any degree of precision, there has always been a considerable amount of danger of strike damage in moving the aircraft up to such a dock. Further, as such a floating dock may have a response to wave action, or to wind action, which is considerably different from the wave or wind response of the flying boat, there is a continuing danger of damage to the latter because of relative movement between the two. While the use of suitable bumpers and pads may serve to diminish the danger of damaging the hull, this relative motion between the dock and the aircraft may cause certain portions of the latter, particularly the outlying members, such as the wings and the tail assembly, to suffer strike damage from contact with the floating dock or fixtures thereon. Moreover, the continuous movement of such outlying members relative to the dock serves to hamper the work of personnel engaged in servicing the aircraft and, when the water is at all rough, or when the wind is gusty, may constitute a serious safety hazard to such personnel.

While most of the flying boats which have been used heretofore have been of the high wing variety, because of the necessity for placing the engines a considerable distance above the water so as to provide clearance for the arcs of the propellers, at least one type of flying boat presently in use, which utilizes jet engines, has an extremely low wing having its underside disposed quite close to the surface of the water when the aircraft is water-borne. It will be readily seen that such low wing flying boats cannot be conveniently or effectively serviced from conventional barges, floating docks, or the like, as considerable portions of the aircraft which will require servicing (in fact, those portions of the aircraft which are most needful of frequent inspection and maintenance) are disposed very near, or on, the surface of the water. Moreover, it is not advisable to bring heavy floats, vessels, or the like, near the wings of such aircraft because while the wings are amply strong to support the aircraft in flight, they are not designed to sustain other stresses and, hence, are particularly susceptible to bending moments which may be caused by incidental contact with such vessels. Even if the wings of these flying boats were suitably strengthened to resist such damage (with the necessarily incident increase in weight and reduction of airborne performance), the fact remains that such conventional apparatus would not allow the maintenance personnel convenient access to the under surface of the wings, and hence, to many parts of the aircraft's structure and equipment which cannot be reached in any other way.

As flying boats are extensively used by the military services and frequently operated from advance bases, such as unimproved harbors, lagoons, and the like, where there are no flying boat beaching facilities available, it has beeen deemed desirable to so construct and arrange seaplane servicing apparatus in such a way that they can be wholly or partially sunk when not in use so as to eliminate, or at least reduce, the likelihood of being observed, and damaged, by an enemy.

As every new model flying boat has a distinctive shape and configuration, as well as distinctive maintenance needs, it will be readily seen that it is highly desirable that the exact shape and configuration of the working area provided by water-borne seaplane servicing apparatus be easily modified or rearranged so as to provide suitable servicing area for any type of flying boat with a minimum expenditure of time and labor, and with conventional equipment.

As any water-borne seaplane servicing facilities must be transported to the locale of their use, as by cargo ships or the like, it is also highly desirable that such equipment be as light and compact as possible so as to reduce the cost of transportation, as well as to reduce the amount of time and effort which will be required to assemble the various components into its working arrangement.

As some phases of the servicing and maintenance of aircraft requires access to various items of specialized equipment which are not suitable for storage on floating docks, or which are, by their nature, suitable for use in connection with the servicing of a number of different aircraft, it may be desirable to locate a floating servicing area convenient to a seagoing vessel, or a permanent dock, which provides proper storage facilities for such equipment. It will therefore be seen that it may be desirable to provide a water-borne seaplane service facility with means for maintaining itself in a selected position relative to a permanent installation, or with a relatively stable water-borne installation, such as a seagoing vessel.

It is therefore an object of this invention to provide water-borne seaplane servicing apparatus which is so constructed and arranged that an aircraft can be taxied or towed thereto with a minimum of danger of injury to the aircraft.

It is another object of this invention to provide water-borne seaplane servicing apparatus which can be made fast to a water-borne seaplane in such a way that there will be no relative wave actuated movement between the two.

It is another object of this invention to provide water-borne seaplane servicing apparatus which can be made fast to a water-borne seaplane in such a way that there will be no relative wind actuated movement between the two.

It is another object of this invention to provide water-borne seaplane servicing facilities which can receive water-borne aircraft and, in effect, lock the aircraft thereto so as to provide a relatively, to the aircraft, stable working area for personnel engaged in servicing activities.

It is another object of this invention to provide a water-borne seaplane servicing apparatus which is suitable for use with aircraft which, when water-borne, have the under surfaces of their wings disposed at or near the surface of the water.

It is another object of this invention to provide a water-borne seaplane servicing apparatus which may be quickly and easily sunk below the surface of the water and which may be quickly and conveniently raised to an operative position at or near the surface.

It is another object of this invention to provide a water-borne seaplane servicing apparatus which may be modified in shape and form by the rearrangement and substitution of various interfitting standardized elements to provide a service area particularly adapted to the configuration of a particular aircraft.

It is another object of this invention to provide a water-borne seaplane apparatus which may be quickly and conveniently disassembled for transport and easily assembled in the water by a relatively small crew with conventional tools and equipment.

It is another object of this invention to provide a water-borne seaplane servicing apparatus which may be easily and quickly repaired when damaged by natural elements, enemy action, or other causes.

It is a further object of this invention to provide means for selectively controlling the position of water-borne servicing apparatus relative to other water-borne craft or to a fixed implacement, such as a permanent dock, sea wall, or the like.

These and other objects of this invention will be fully understood from the following detailed description of a typical preferred form and application of the invention, throughout which description reference is made to the accompanying drawings in which:

Figure 7 is a top plan view of the dry dock assembly illustrating the position thereof when an aircraft is to be taxied thereinto.

Generally speaking, the water-borne seaplane servicing facilities embodying this invention includes a floating dry dock having a longitudinally extending well defining a channel into which the seaplane may be towed or taxied. When a seaplane is brought within the channel, various supporting means mounted on the dry dock are energized to engage various portions of the aircraft so as to support it against relative lateral movement and relative downward vertical movement. The dry dock is then raised, together with the aircraft, which is supported by the above mentioned means, until the aircraft no longer has its own buoyancy and is entirely dependent upon the supporting means of the dry dock for support. While the dry dock may be constructed as a unitary integral structure, it is within the contemplation of this invention that in a preferred embodiment the dry dock would be formed by a temporary, or semi-permanent, association of a number of interchangeable self-contained buoyant units, at least some of which have a variable buoyancy.

It is within the contemplation of this invention that the dry dock should include transversely extending portions which substantially correspond to the overall configuration of the aircraft, that is to say, the transversely extending portions follow the general outline of the wings and, if desired, the horizontal stabilizers. These transversely extending portions define wing (or tail) servicing areas inasmuch as they provide a working platform for personnel engaged in servicing and maintenance activities. While these transversely extending servicing areas may be incorporated into or made integral with the floating dry dock, it is within the contemplation of this invention that in a preferred embodiment these areas would be formed of a temporary, or semi-permanent, association of a number of interchangeable self-contained buoyant units attached together in the necessary numbers to form a wing servicing area, this area having a size suitable for aiding the servicing of the wings of a particular aircraft. In other words, the larger the aircraft, the larger the number of buoyant units that would have to be secured together to provide a suitable wing servicing area.

Figure 1:
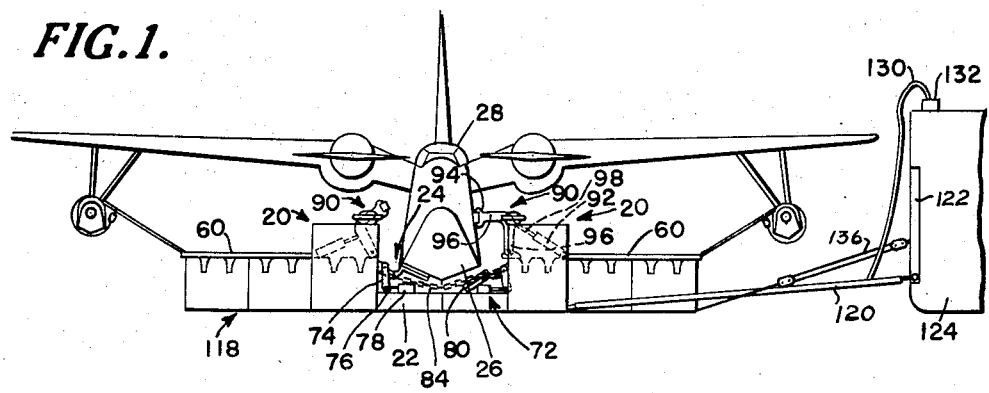
Figure 1 is a front elevational view of the seaplane servicing facility.
Figure 2:
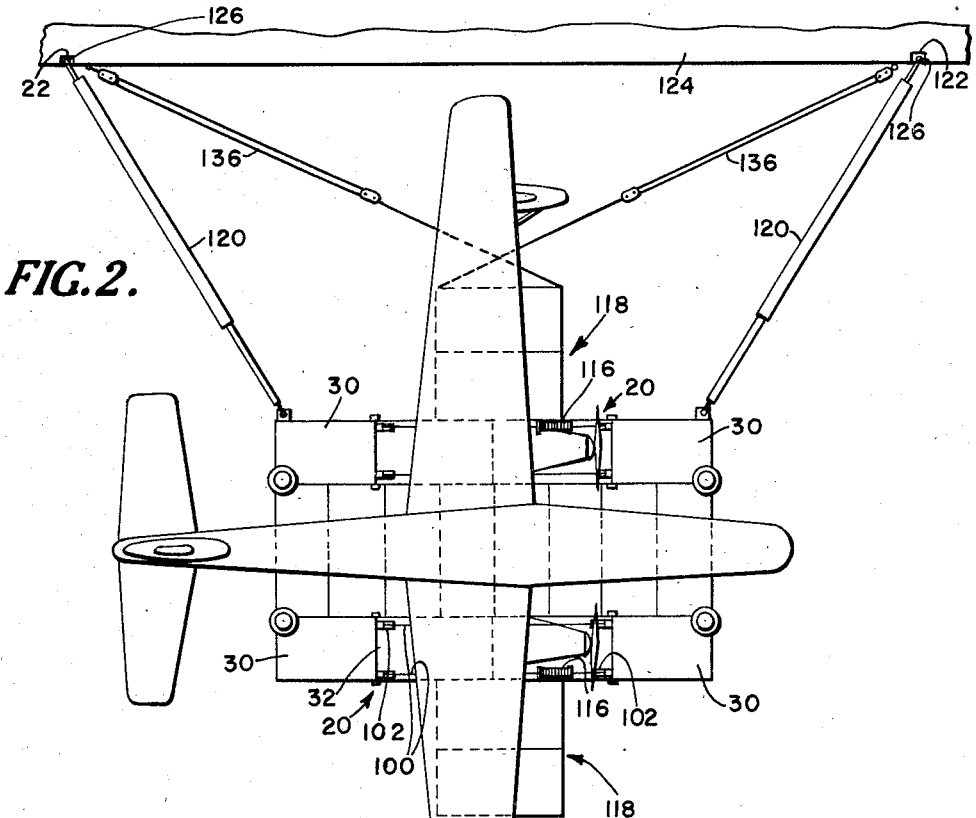
Figure 2 is a plan view of the seaplane servicing facility.
Figure 3:
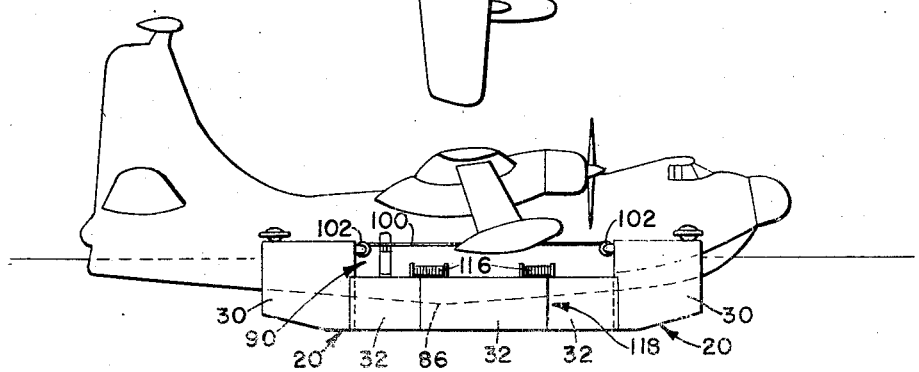
Figure 3 is a side elevational view of the seaplane servicing facility.

Referring more particularly to Figures 1, 2, and 3, it will be seen that the floating dry dock has side members, generally indicated at 20, formed by two parallel transversely aligned spaced rows of buoyant units. These side members 20 are held in a fixed position relative to one another by their attachment with a plurality of transversely extending cross members, such as box frames 22, located at or near the undersides of the side members. The well 24 between the side members 20 defines an elongated channel having a width somewhat greater than the maximum width of the immersed portion of the hull 26 (Figure 1) of the aircraft 28 with which the dry dock is to be used. As best shown in Figures 2 and 3, the well 24 has a length which at least approximates the length of the immersed portion of the hull 26.

Figure 4:
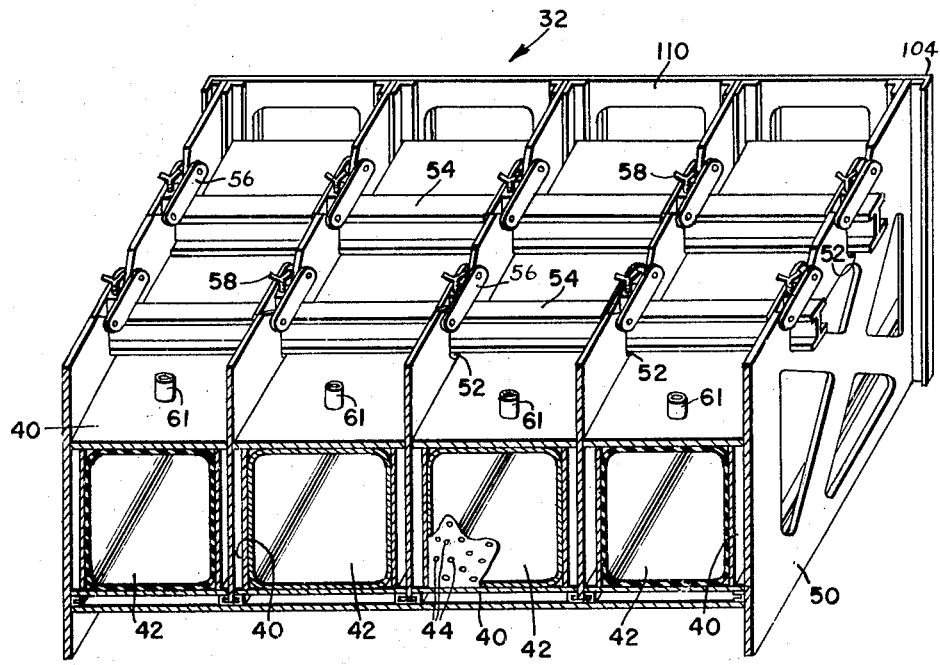
Figure 4 is a perspective view, with portions shown in vertical section, of a variable buoyancy buoyant unit.

Each of the side members 20 consists of an elongated row of tandemly aligned buoyant units. In the illustrated preferred embodiment of the buoyant units at the end of each row are sealed tanks 30, of fixed buoyancy, while the buoyant units intermediate these tanks are buoyant units 32, having a buoyancy which may be varied, as will be explained hereinafter. Referring more particularly to Figure 4, it will be seen that a variable buoyancy buoyant unit 32 consists of structural framework of longitudinal and lateral members enclosing plates which define a number of cell casings 40, each of which encloses an inflatable cell 42 which may be constructed of rubber, plastic or other flexible materials. Each cell casing 40 is provided with a plurality of apertures 44 disposed along its lower portion to allow water to flow easily into and out of the cell casing. In the preferred embodiment illustrated, each of the lateral braces 50 of the structural framework has a portion cut out to define a saddle 52, each of the saddles being longitudinally aligned with one another so as to define a seating for the longitudinally extending strong back 54, which may be an I-beam. In a preferred embodiment there are two parallel strong backs 54 on each variable buoyancy buoyant unit 32. The lateral braces 50 are each provided with a locking means to hold each strong back 54 within its saddle 52, such as a hinged blade 56 which spans the saddle above the strong back and is fitted with a hold down means, such as wing bolts 58 which are threaded thereto and adjustable to bear against the strong back.

Still referring to Figure 4, it is within the contemplation of this invention that the upper surface of the individual variable buoyancy buoyant units 32 will be covered with a suitable walkway, such as a grating 60 or the like (not shown in Figure 4, but seen in Figure 1) so as to provide a suitable working area for men servicing the aircraft.

Figure 5:
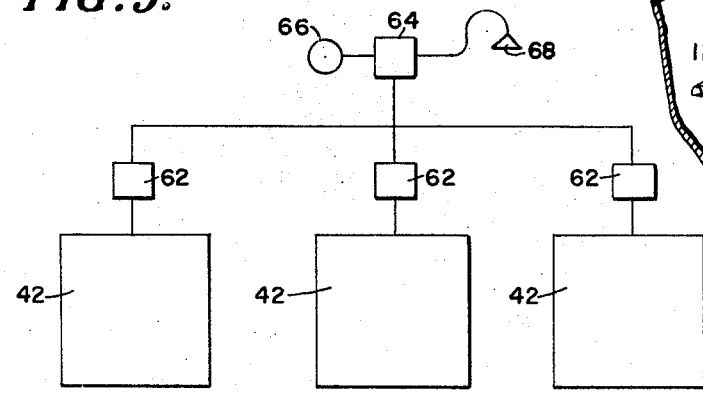
Figure 5 is a schematic diagram of the piping and valving arrangement associated with an individual inflatable cell of the variable buoyancy buoyant unit.

Each cell 42 of each buoyant unit 32 has a mouth 61 attached to, and extending through, the upper portion of the cell casing 40 and this is connected by any suitable means, such as flexible piping or hose, with a common source of pressure air through a conventional three-way valve which may be operated to vent each of the cells. It will be understood that each cell should be provided with a fluid stop valve, which may be of conventional design, to allow a bilateral flow of pressurized air but which is constructed to prevent the entry of water into the air pressure system in the event that one of the cells bursts or is otherwise injured. Inasmuch as these elements are so well known in the art, it is not deemed necesssary to describe them in any particularity here, but rather, reference is made to Figure 5 which schematically illustrates the preferred arrangement with 62 representing the fluid stop valve for each cell 42, 64 representing the three-way valve, 66 representing the source of pressurized air, and 68 representing the vent.

Referring again to Figure 1, it is within the contemplation of this invention to provide means to engage a water-borne aircraft 28 floating in the channel defined by the well 24 and to support it against relative downward vertical movement. To achieve this end, there are provided at least one pair of pneumatically operated chocking assemblies, generally indicated at 72 (Figure 1), each such assembly being made up of a pivotally mounted rocker member having one arm 74 pivotally connected with a reciprocal piston rod 76, of a pneumatic cylinder 78, and having another arm or chock 80 suitably padded and shaped to conform to the configuration of the underside of the hull 26 of flying boat 28 when operatively positioned in contact therewith. In Figure 1, one chock 80 is illustrated as operatively engaged with the hull of the flying boat 28, while the other is illustrated in a relaxed inoperative position. As will be understood, this illustration merely shows the alternate position of the chocks 80 and it is within the contemplation of this invention that both chocks will be operated simultaneously.

It should be clear that the chocking assembly 72 does not operate to lift an aircraft floating on the water in the channel defined by the well, but rather merely brings the chocks 80 into firm engagement with the hull 26 of the aircraft 28. The actual lifting of the aircraft occurs when the entire dry dock assembly is raised in a manner which will be described hereinafter.

The operation of the chock assemblies 72 may be manually controlled or, as in this preferred embodiment, the pneumatic cylinders 78 are energized by the opening of a suitable air valve (not shown) by the tensioning of a trip cable 84 extending across the well 24 of the dry dock at a level below the initial water line. In such a case, the aircraft 28 utilizing the dry dock would be provided with a small releasable hook 86 depending from the lowermost point on the hull, which hook would engage the trip cable 84 when the aircraft enters the channel defined by the well 24 and reaches the correct position therewithin.

Referring to Figures 1 and 3, it is also within the contemplation of this invention to provide means to engage a water-borne aircraft 28 floating in the channel defined by the well 24 and to support it against relative lateral movement. To achieve this end, the dry dock is equipped with one or more sets of transversely opposed pneumatically operated shores, generally indicated at 90, which are here illustrated as activated by pneumatic cylinders 92, to bear against the sides of the hull 26 of the flying boat 28 and to hold the latter against any lateral displacement or shifting. In a preferred embodiment, the shores 90 consist of suitably cushioned roller pads 94 fixed at the free end of an L-shaped lever 96 pivotally mounted at the second free end, an intermediate portion of said lever being pivotally connected with a reciprocable piston 98 on the pneumatic cylinder 92.

In Figure 1, one shore 90 is illustrated as operatively engaged with the hull 26 of the flying boat 28, while the other is illustrated in a relaxed, or inoperative position. As will be understood, this illustration merely shows the alternate positions of the shores and it is within the contemplation of this invention that both shores are operated simultaneously. The pneumatic cylinders 92 may be energized by manual operation of a suitable valve, or, as in this preferred embodiment, may be energized by the operation of the same valve which energizes pneumatic cylinders 78, that is to say, the valve operated by trip cable 84, as discussed hereinabove.

As has been explained hereinabove, each of the fixed buoyancy sealed tanks 30 and the variable buoyancy buoyant units 32 are entirely separate and self-contained. The exact number of variable buoyancy buoyant units 32 that will be interposed between the sealed tanks 30 will, of course, depend upon the size of the aircraft to be serviced by the floating dry dock created by the finished assembly.

The side members 20 are assembled by floating the respective units thereof into approximate alignment and then drawing them together into an integral unit by means of the cables 100 rove about winches 102, the latter being fitted on the sealed tanks 30. While a given side member 20 may be held together by the application of sufficient tension to the cables 100, it is within the contemplation of this invention that the various units thereof be mechanically clamped together, or bolted together by bolts passing through suitable apertures 103 in the end flanges 104 (Figure 6) of the variable buoyancy buoyant units 32. Of course, a side member can also be assembled on the deck of a ship or on a permanent dock or quay and then lowered into the water.

When a given side member 20 has been assembled and floated, it is transversely aligned with an identical side member 20 and the two are fixed together by their attachment, by any suitable means, not shown, with the transversely extending cross members 22, so as to form the complete dry dock assembly. An example of such suitable means would consist of bolts (Figure 6) to engage suitable fittings on the cross members 22. The chocking means 72 and the shoring means 90 are then fitted in place on the cross members 22 and the upper surface of the side members 20, respectively. A suitable source of air pressure, such as a blower, compressor, or an air flask, together with the necessary piping (or hose) and operating valves are then installed in any appropriate location where they will not interfere with the activity of the personnel using and operating the assembled dry dock. Upon the installation of the grating 60, as has been described hereinabove, the floating dry dock assembly is completed and ready for operation.

Referring to Figures 1, 2 and 3, the dry dock assembly is best operated by venting the inflatable cells 42 of the variable buoyancy buoyant units 32 until the water entering the cell casings 40 through apertures 44, has collapsed the cells to such a degree that the entire floating dry dock assembly sinks to such a level that the depth of the well 24, and, more particularly, the upper surfaces of the chocks 80, which are in their relaxed position, is sufficient to accommodate the hull 26 of the aircraft 28 to be serviced. Naturally this particular depth will vary with the draft of the particular type or model of aircraft concerned and with the sizes of the structures used, and the illustration of the drawings, in which the upper surfaces of the variable buoyancy units 32 are submerged, while the upper surfaces of the sealed tanks 30 are above the water level, is merely exemplary. The aircraft is then towed into the channel defined by the well 24, or may be taxied thereinto by the use of suitable means, such as the breasting-in-rig disclosed in the copending application of Hodge, Serial No. 564,007, assigned to a common assignee, or by the use of other suitable means. When the aircraft reaches a proper position within the dry dock assembly, its releasable hook 86 will engage the trip cable 84 and so tension it as to operate a valve 64 (Figure 5) to supply the respective inflatable cells 42 with the pressurized air from pressurized air source 66. If desired, the trip cable 84 may also be arranged to operate a valve (not shown) which supplies pressurized air to the pneumatic cylinder 92, to operate the shore means 90, and to the pneumatic cylinder 78, to operate the chocking means 72. The flow of pressurized air into each of the inflatable cells 42 will cause the latter to expand and displace the water then residing within the cell casing 40, thereby increasing the overall buoyancy of the entire dry dock assembly. As the weight of the water displaced by the inflation of the inflatable cells 42 approaches the weight of the aircraft 28, the entire dry dock assembly, together with the aircraft which is resting upon chocks 80, will rise in the water until the hull of the aircraft is completely without the water. However, it should here be stated that in order to fulfill the stated objects of this invention dealing with the elimination of relative movement between the aircraft and the floating dock, it is not necessary to completely remove the aircraft from the water. As long as the chocks 80, and hence the floating dry dock as a whole, are supporting a substantial amount of the weight of the aircraft, the fact that the water is supporting the remainder of weight of the aircraft will have no practical consequence.

When the servicing of the aircraft is completed, the valve 64 may be operated to vent the inflatable cells 42, which will be collapsed, at least partially, by the water pressure, and the entire floating dry dock will then sink to a level whereby it is supported only by the fixed buoyancy buoyant units 30 and the residual buoyancy in variable buoyancy buoyant units 32, that is to say, it will sink to a level whereby the aircraft can float free of the chocks 80. The chocking means 72 and the shoring means 90 are then relaxed and the aircraft is towed or taxied out of the channel defined by the well 24.

When it is desired to service the wings of the aircraft, or engines, or other fittings thereon, it is within the contemplation of this invention to provide the floating dry dock with transversely extending portions creating working areas which substantially correspond to the general outline of the wings.

Figure 6:
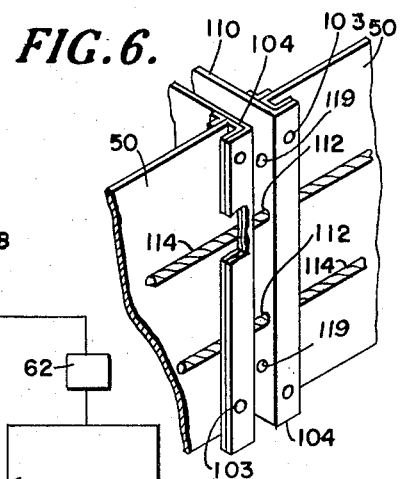
Figure 6 is a fragmentary perspective view illustrating the association of two variable buoyancy buoyant units in a side-by-side relation as in the side portions of the floating dry dock assembly.

In such a case, several variable buoyancy buoyant units 32 are floated into position on the respective sides of the dry dock assembly and are then aligned in transversely (of the dry dock) extending rows. As best shown in Figure 6, each of the variable buoyancy buoyant units 32 has its longitudinally extending side members 110 arranged to extend slightly beyond the longitudinal ends thereof to define a flange 104. Each of the flanges 104 have transversely extending apertures 112 drilled therein, so that when a number of units 32 are transversely aligned with one another, the apertures 112 will also be both vertically and transversely aligned. A cable 114 is then rove through each corresponding group of apertures 112 and about a winch 116 (Figures 2 and 3), mounted on the upper surface of each side portion 20, and the winch is then operated to draw the respective buoyancy units 32, first close together, and then snugly against the side of side member 20, opposite the side facing well 24, so as to form, in effect, an integral structure therewith. While these buoyancy units 32 may be held together, and fast against the side portions 20, by the application of sufficient tension to the cable 114, it is within the contemplation of this invention that these buoyant units may be bolted together, and to the buoyancy units 32 of the side members 20, by bolts (not shown) passing through suitable apertures 119 (Figure 6) in the flanges 104 thereof.

The respective inflatable cells 42 of the respective variable buoyancy buoyant units 32, forming the transversely extending portions, generally indicated at 118 (Figures 1, 2 and 3), are then connected, by suitable piping or hose (not shown), with the air pressure system of the floating dry dock, which has already been described. In such a case, when the dry dock assembly is partially sunk, by the venting of the inflatable cells 42, the transversely extending portions 118 will experience an identical downward movement. Similarly, the transversely extending portion will experience an upward movement identical with that of the dry dock proper when the inflatable cells 42 are supplied with pressurized air.

It will now be seen that this feature will be of particular value in the case of low wing flying boats which have the undersurfaces of their wing normally located at or near the surface of the water, as otherwise, such aircraft could not be towed, or taxied, into the well of the dry dock without danger of strike damage to the wings thereof.

If it is desired to sink the entire dry dock assembly, together with any transversely extending portions 118 that may be affixed thereto, the cells 42 of the variable buoyancy units 32 are vented completely. In such a case, if the sealed tanks 30 have been properly proportioned, the overall buoyancy of the dry dock assembly will be insufficient to maintain it upon the surface of the water and it will therefore sink.

While the dry dock assembly may be anchored far from shore, or from other ships, it is within the contemplation of this invention that it may be positioned adjacent a relatively immobile object, such as a fixed dock or a large ship, having storage space for equipment and supplies, and facilities for the personnel engaged in the aircraft servicing activities. Accordingly, there are provided means for selectively positioning the dry dock assembly relative to such a relatively immobile object, such as a dock or ship, and these means will now be described.

In the preferred embodiment illustrated in Figures 3 and 7, each end of one side member 20, that is to say, each sealed tank 30 thereof, is pivotally connected with the end of a pneumatically extensible boom 120. The other ends of the booms are each fitted into a vertically extending slot 122 formed in the ship or dock 124 to which the dry dock assembly is attached and with respect to which it is to be relatively positioned. The relation of the ends of the booms 120 and the slots 122 are such that the former are free to move vertically within the latter although they cannot be withdrawn therefrom, and the booms may swing laterally about the ends within the slot. This effect is reached by the provision of a knuckle 126 on the ends of each boom 120, and by forming the slots 122 with a relatively narrow opening through which the knuckles cannot pass.

As best shown in Figure 7, the dry dock assembly, as a whole, may be turned to present its entrance to a flying boat taxiing, or being towed, toward the immobile object 124 on a relatively oblique course. This position is effected by selectively extending an extensible boom 120, and, if desired, shortening the other boom, by air pressure supplied thereto by a hose 130 which is connected to an air pressure source 132.

The aircraft may then be secured to the dry dock assembly by the means which have already been described and then serviced as required. The servicing may be done with the dry dock assembly in the initial position or, the dry dock may be turned, by appropriate extension and contraction of the respective extensible booms 120 to the position illustrated in Figure 2 prior to the undertaking of the servicing activities.

Figure 8:
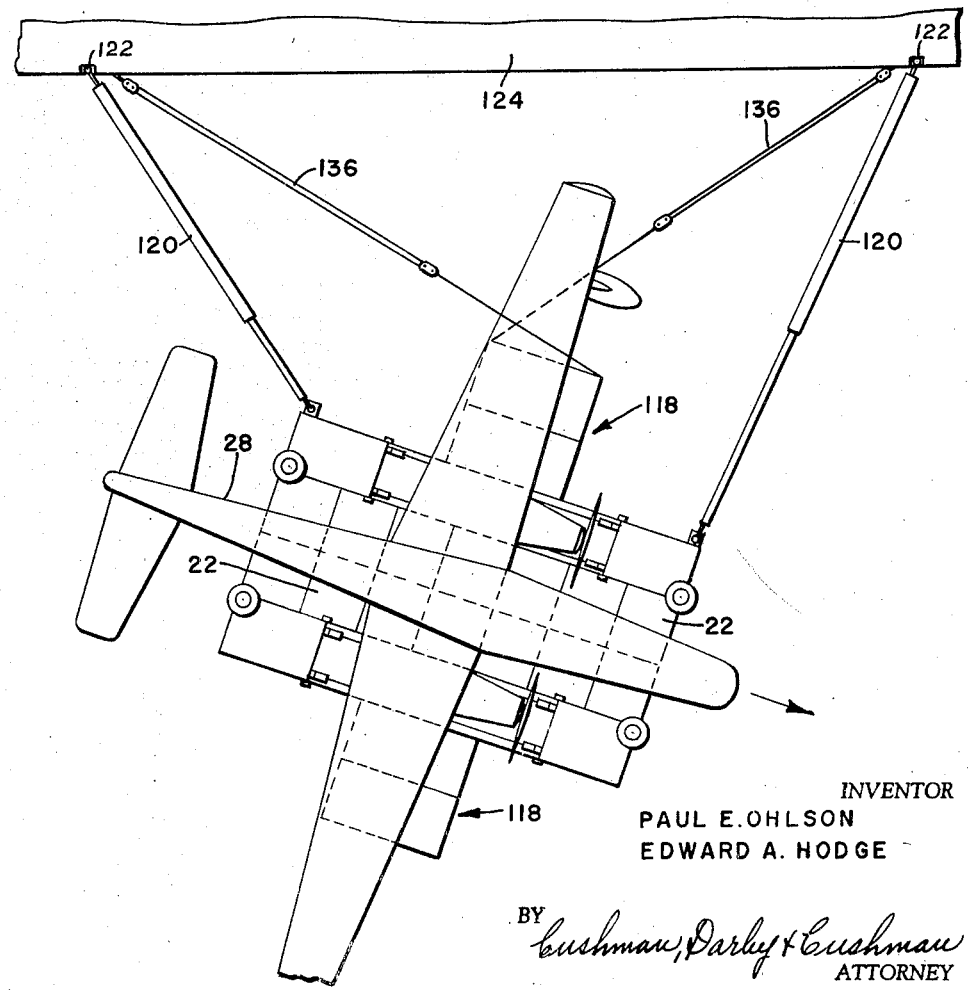
Figure 8 is a top plan view of a dry dock assembly illustrating the position thereof when an aircraft is to be taxied out.

The servicing of the aircraft is complete, and the aircraft is ready to be taxied out of the dry dock assembly, the extensible boom 120, at the end of the dry dock assembly which serves as an exit, is extended while the boom nearest the entrance thereof is held fast, or contracted, as desired, to swing the exit of the dry dock assembly away from the immobile object 124 so that when the aircraft is released from the dry dock assembly, it may be taxied, or towed therefrom, into open water on a straight course. In Figure 7, the dry dock assembly is illustrated in a position to receive the aircraft, and the second position, that is to say, the position of the dry dock assembly when the aircraft is to be taxied or towed out, is illustrated in Figure 8.

It may be desirable to brace the inboard end, that is to say, the end nearest the immobile object 124, of the transversely extending portions 118 by securing the latter by means of block and tackle assemblies 136 attached to the immobile object.

While the air sources have here been considered to be blowers, or flasks of pressurized air, it should be clear that the various pneumatic apparatus may be supplied with pressurized air from a separate compressor, or from some other source. It is within the contemplation of this invention that the pressurized air source be mounted with a sealed tank 30 so as to be protected from the water. Of course, the pneumatically operated mechanical means may, in accordance with this invention, be modified to be operated by hydraulic pressure, or by some other means.

Having described only a typical preferred form and application of our invention, we do not wish to be limited or restricted to specific details herein set forth but wish to reserve to ourselves any variations of modifications that may appear to those skilled in the art and falling within the scope of the following claims:

We claim:

1. A floating dry dock for servicing water-borne aircraft comprising: at least two buoyant means, each of said buoyant means comprising both fixed buoyancy means and variable buoyancy means; means for selectively varying the buoyancy of said variable buoyancy means; structural means for maintaining said buoyant means in transversely aligned spaced parallel relation to define an open-ended channel therebetween, the channel having a width greater than the maximum width of the water-immersed portion of the hull of the aircraft to be serviced, and having a length at least approximating the length of the immersed portion of the hull of the aircraft to be serviced, said last claimed means being constructed and arranged to remain free of the hull of a water-borne aircraft disposed within the channel when said buoyant means have sufficient buoyancy to maintain at least a portion thereof above the surface of the water; selectively operable aircraft support means mounted in a fixed position relative to said buoyant means, at least some of said means being located in said channel and mounted for substantially vertical movement to engage the undersurface of the water-immersed portions of the hull of the aircraft to be serviced.

2. The structure defined in claim 1 in which said means for selectively varying the buoyancy of said buoyant means includes a plurality of inflatable cells; rigid inflatable cell expansion guide means encasing each of said cells; said cells having an upper portion affixed to said guide means, the arrangement being such that the inflatable cell is free to expand downwardly upon being inflated, but is confined against lateral and vertical expansion.

3. The structure defined in claim 1 in which said means for selectively varying the buoyancy of said buoyant means comprises a plurality of inflatable cells; a rigid inflatable cell enclosing means surrounding each of said cells, each of said means having at least a portion of its lower surfaces defining apertures for the entry and exit of water into said means.

4. The structure defined in claim 1 in which said means for selectively varying the buoyancy of said buoyant means includes a plurality of rigid inflatable cell enclosing means; an inflatable cell disposed within each of a plurality of said inflatable cell enclosing means, each of said cells having an upper portion affixed to the corresponding enclosing means whereby the latter serves as an expansion guide means to allow said cell to expand downwardly when inflated but to confine lateral and vertical expansion of said cells; said enclosing means having a lower portion defining at least one opening to allow the entry of water therein when said cell is at least partially collapsed and to allow the exit of water displaced by the inflation of said cell.

5. The structure defined in claim 4 in which said means for varying the buoyancy of said buoyant means includes means for supply pressurized gas at a uniform pressure to each of said inflatable cells and means for uniformly venting each of said inflatable cells.

6. The structure defined in claim 5 and further including means for maintaining said buoyant means in spaced relation to a relatively immobile object, said last claimed means including means for selectively positioning said dry dock by oscillating the latter to present a selected end of the channel thereof to the immobile object while presenting the other end of the channel to open water.

7. The structure defined in claim 6 in which the dry dock positioning means includes a plurality of booms extending from said buoyant means to the immobile object, at least one of said booms being selectively extensible and contractable.

8. A floating dry dock for servicing water-borne aircraft comprising: two buoyant means transversely aligned in spaced relation to define an elongated open-ended channel dimensioned to receive the air craft; means engaged with each of said buoyant means for maintaining said buoyant means in fixed relation to one another, said means being constructed and arranged to remain free of the hull of a water-borne aircraft disposed within the channel when said buoyant means have sufficient overall buoyancy to maintain at least a portion thereof above the surface of the water; each of said buoyant means including a plurality of self-contained variable buoyancy buoyant units and a plurality of fixed buoyancy buoyant units; selectively operable aircraft support means mounted in a fixed position relative to said buoyant means, at least some of said means being located in said channel and mounted for substantially vertical movement to engage the undersurface of the water-immersed portions of the hull of the aircraft to be serviced.

9. The structure defined in claim 8 in which each of the buoyant means includes the disposition of one of said fixed buoyancy buoyant units at each end of an aligned row of variable buoyancy units; winch and tackle means mounted on at least one of the fixed buoyancy units of each buoyant means to draw the respective fixed buoyancy units together to clamp the last mentioned units and the aligned variable buoyancy units together into an integral structure.

10. The structure defined in claim 9 and further including an inflatable cell disposed within each of said variable buoyancy buoyant units; means connected with said variable buoyant means for uniformly varying their buoyancy including means for supplying pressurized gas at a uniform pressure to each of said inflatable cells and means for uniformly venting each of said inflatable cells.

11. The structure defined in claim 9 in which other variable buoyancy buoyant units are secured to the aligned row of variable buoyancy buoyant units to define a servicing area for the wing portions of an aircraft disposed within the channel.

12. The structure defined in claim 11 and further including an inflatable cell disposed within each of said variable buoyancy buoyant units; mean for uniformly varying the buoyancy of each of said variable buoyancy means including means for supplying pressurized gas at a uniform pressure to each of said inflatable cells and means for uniformly venting each of said inflatable cells.

13. The structure defined in claim 12 and further including a second winch and tackle means mounted on one of said variable buoyancy buoyant units of the aligned row of variable buoyancy buoyant units to draw said other variable buoyancy buoyant units thereto and to hold the latter fast against the former to form an integral structure therewith.

14. The structure defined in claim 12 and further including means for maintaining said buoyant means in spaced relation to a relatively immobile object, said last claimed means including means for selectively positioning said dry dock by oscillating the latter to present a selected end of the channel thereof to the immobile object while presenting the other end of the channel to open water.

15. The structure defined in claim 14 in which the dry dock positioning means includes a plurality of booms extending from said buoyant means to the immobile object, at least one of said booms being selectively extensible and contractable.

References Cited in the file of this patent

UNITED STATES PATENTS

| | | |
|---|---|---|
| 1,235,089 | Wiking | July 31, 1917 |
| 1,250,787 | Breault | Dec. 18, 1917 |
| 1,752,894 | Degn | Apr. 1, 1930 |
| 1,937,973 | Mayo | Dec. 5, 1933 |
| 2,514,409 | Mulick | July 11, 1950 |
| 2,732,818 | Quirin | Jan. 31, 1956 |
| 2,756,712 | Harris | July 31, 1956 |

FOREIGN PATENTS

| | | |
|---|---|---|
| 290,505 | Great Britain | May 17, 1928 |